United States Patent
Sato et al.

(10) Patent No.: US 9,120,927 B2
(45) Date of Patent: Sep. 1, 2015

(54) PROCESS FOR PRODUCING THERMOPLASTIC ELASTOMER COMPOSITION

(75) Inventors: Shun Sato, Kanagawa (JP); Koichi Kawaguchi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 554 days.

(21) Appl. No.: 13/505,094

(22) PCT Filed: May 23, 2011

(86) PCT No.: PCT/JP2011/062303
§ 371 (c)(1),
(2), (4) Date: Apr. 30, 2012

(87) PCT Pub. No.: WO2012/042975
PCT Pub. Date: Apr. 5, 2012

(65) Prior Publication Data
US 2012/0214943 A1    Aug. 23, 2012

(30) Foreign Application Priority Data
Sep. 29, 2010   (JP) ................. 2010-219051

(51) Int. Cl.
| | | |
|---|---|---|
| *C08F 8/30* | (2006.01) | |
| *C08L 77/00* | (2006.01) | |
| *C08L 77/02* | (2006.01) | |
| *C08L 23/28* | (2006.01) | |
| *C08L 77/06* | (2006.01) | |
| *B60C 1/00* | (2006.01) | |

(52) U.S. Cl.
CPC ............. *C08L 77/02* (2013.01); *B60C 1/0008* (2013.04); *C08L 23/283* (2013.01); *C08L 77/06* (2013.01); *C08L 2312/00* (2013.01)

(58) Field of Classification Search
None
See application file for complete search history.

(56) References Cited

U.S. PATENT DOCUMENTS

| | | |
|---|---|---|
| 5,910,544 A | 6/1999 | Ozawa et al. |
| 6,062,283 A | 5/2000 | Watanabe et al. |
| 6,294,602 B1 | 9/2001 | Shimo et al. |
| 2006/0252874 A1 | 11/2006 | Soeda et al. |
| 2010/0108221 A1 | 5/2010 | Shibata et al. |
| 2010/0112257 A1 | 5/2010 | Morooka |
| 2010/0175802 A1 | 7/2010 | Morooka |
| 2011/0028651 A1* | 2/2011 | Kawaguchi et al. .......... 525/186 |

FOREIGN PATENT DOCUMENTS

| | | |
|---|---|---|
| EP | 2267073 | 12/2010 |
| JP | 4-370130 A | 12/1992 |
| JP | 5-032837 A | 2/1993 |
| JP | 2005-054195 A | 3/2005 |
| JP | 2006-514141 A | 4/2006 |
| JP | 2008-273424 A | 11/2008 |
| JP | 2009-263653 A | 11/2009 |
| JP | 2010-132850 A | 6/2010 |
| WO | WO-97/45489 A1 | 12/1997 |
| WO | WO-2008/149909 A1 | 12/2008 |

OTHER PUBLICATIONS

Extended European Search Report issued May 15, 2014 in counterpart European Application No. 11822817.

* cited by examiner

*Primary Examiner* — Ana Woodward
(74) *Attorney, Agent, or Firm* — Novak Druce Connolly Bove + Quigg LLP

(57) ABSTRACT

Disclosed is a process for producing a thermoplastic elastomer composition having a matrix phase comprising a polyamide and an ethylene/vinyl alcohol copolymer and a disperse phase comprising a rubber composition, by which gelation by a reaction between a polyamide and an ethylene/vinyl alcohol copolymer can be inhibited and the dispersion of the rubber composition can be good. In the process, the polyamide resin and the rubber composition are melt-blended to the extent necessary for the rubber composition to form a disperse phase, and then the ethylene/vinyl alcohol copolymer is added and further melt-blended together.

8 Claims, No Drawings

PROCESS FOR PRODUCING THERMOPLASTIC ELASTOMER COMPOSITION

CROSS REFERENCE TO RELATED APPLICATIONS

This application is a National Phase filing under 35 U.S.C. §371 of PCT/JP2011/062303 filed on May 23, 2011; and this application claims priority to Application No. 2010-219051 filed in Japan on Sep. 29, 2010 under 35 U.S.C. §119; the entire contents of all are hereby incorporated by reference.

TECHNICAL FIELD

The present invention relates to a process for producing a thermoplastic elastomer composition. More specifically, it relates to a process for producing a thermoplastic elastomer composition having a matrix phase comprising a polyamide resin and an ethylene/vinyl alcohol copolymer and a disperse phase comprising a rubber composition.

BACKGROUND ART

A pneumatic tire using as an air barrier layer a film of a thermoplastic elastomer composition prepared by blending a thermoplastic resin, such as a nylon 6/66 copolymer or a vinyl alcohol/ethylene copolymer, and an elastomer, such as a brominated copolymer of isobutylene and p-methylstyrene, has been known. See Japanese Unexamined Patent Publication No. 2008-273424.

Further, a tire inner liner comprising a film containing at least a layer composed of a resin composition, in which a viscoelastic material such as brominated isobutylene-p-methylstyrene is dispersed in a resin containing a modified ethylene/vinyl alcohol copolymer, has been known. See Japanese Unexamined Patent Publication No. 2009-263653.

An example of a preparation of a thermoplastic resin composition by melt-kneading a modified polyamide resin, an ethylene/vinyl alcohol copolymer and a maleic anhydride-modified ethylene/propylene copolymer has been disclosed. See Japanese Unexamined Patent Publication No. 2010-132850.

SUMMARY OF INVENTION

Technical Problem

If a polyamide resin, an ethylene/vinyl alcohol copolymer, and a rubber composition are supplied into a twin screw kneader altogether for producing a thermoplastic elastomer composition by melt-blending, a polyamide and an ethylene/vinyl alcohol copolymer react with each other, and therefore there occurs a problem that gelation takes place, if kneading is conducted at an elevated temperature and for a long period of time. Further the dispersion may become inadequate, due to possible poor compatibility of the ethylene/vinyl alcohol copolymer with the rubber composition; especially due to the poor compatibility with a halogenated isoolefin/p-alkylstyrene copolymer, there is a drawback of poor dispersion. The present invention provides, with respect to a process for producing a thermoplastic elastomer composition having a matrix phase comprising a polyamide resin and an ethylene/vinyl alcohol copolymer and a disperse phase comprising a rubber composition, a process for producing a thermoplastic elastomer composition, by which gelation by a reaction between a polyamide and an ethylene/vinyl alcohol copolymer is inhibited and the dispersion of the rubber composition is good.

Solution to Problem

The first aspect of the present invention is a process for producing a thermoplastic elastomer composition having a matrix phase comprising a polyamide resin and an ethylene/vinyl alcohol copolymer and a disperse phase comprising a rubber composition, wherein the polyamide resin and the rubber composition are melt-blended to the extent necessary for the rubber composition to form a disperse phase, and then the ethylene/vinyl alcohol copolymer is added and further melt-blended together.

The second aspect of the present invention is a process for producing a film of a thermoplastic elastomer composition having a matrix phase comprising a polyamide resin and an ethylene/vinyl alcohol copolymer and a disperse phase comprising a rubber composition, wherein a blend prepared by melt-blending the polyamide resin and the rubber composition and the ethylene/vinyl alcohol copolymer are dry-blended and fed to a forming extruder for carrying out melt-blending and forming of a film simultaneously.

The third aspect of the present invention is a pneumatic tire comprising the thermoplastic elastomer composition produced by the foregoing process as an inner liner.

More specifically, the present invention includes the following embodiments.

[1] A process for producing a thermoplastic elastomer composition having a matrix phase comprising a polyamide resin and an ethylene/vinyl alcohol copolymer and a disperse phase comprising a rubber composition, wherein the polyamide resin and the rubber composition are melt-blended to the extent necessary for the rubber composition to form a disperse phase, and then the ethylene/vinyl alcohol copolymer is added and further melt-blended together.

[2] The process according to [1] above, wherein a blend prepared by melt-blending the polyamide resin and the rubber composition and the ethylene/vinyl alcohol copolymer are dry-blended and fed to a forming extruder for carrying out melt-blending and forming simultaneously.

[3] The process according to [1] above, wherein, using a twin screw kneader having at least two supply ports, the polyamide resin and the rubber composition are supplied to an upstream supply port of the twin screw kneader, and the ethylene/vinyl alcohol copolymer is supplied to a downstream supply port of the twin screw kneader.

[4] The process according to any one of [1] to [3] above, wherein a melt viscosity $\eta_d$ at 250° C. and 243 $s^{-1}$ of the blend prepared by melt-blending the polyamide resin and the rubber composition is higher than a melt viscosity $\eta_c$ at 250° C. and 243 $s^{-1}$ of the ethylene/vinyl alcohol copolymer to be added.

[5] The process according to any one of [1] to [4] above, wherein the melt-blending is carried out continuously using a twin screw kneader, and by the melt-blending the rubber composition is dispersed as well as dynamically cross-linked.

[6] The process according to any one of [1] to [5] above, wherein the thermoplastic elastomer composition comprises 0.1 to 7.3% by weight of the ethylene/vinyl alcohol copolymer based on the total weight of the thermoplastic elastomer composition.

[7] The process according to any one of [1] to [6] above, wherein the polyamide resin is at least one selected from the group consisting of nylon 11, nylon 12, nylon 6, nylon 66, a nylon 6/66 copolymer, nylon 612, nylon MXD6, a nylon 6/66/12 copolymer, nylon 46, nylon 9T, nylon 6T, and nylon 610.

[8] The process according to any one of [1] to [7] above, wherein the ethylene/vinyl alcohol copolymer has an ethylene content of 32 to 48% by mol and a degree of saponification of not less than 90%.

[9] The process according to any one of [1] to [8] above, wherein the rubber composition comprises at least one selected from the group consisting of a halogenated isoolefin/p-alkylstyrene copolymer, a maleic anhydride-modified ethylene/α-olefin copolymer, and a maleic anhydride-modified ethylene/ethyl acrylate copolymer.

[10] A process for producing a film of a thermoplastic elastomer composition having a matrix phase comprising a polyamide resin and an ethylene/vinyl alcohol copolymer and a disperse phase comprising a rubber composition, wherein a blend prepared by melt-blending the polyamide resin and the rubber composition and the ethylene/vinyl alcohol copolymer are dry-blended and fed to a forming extruder for carrying out melt-blending and forming a film simultaneously.

[11] A pneumatic tire comprising the thermoplastic elastomer composition produced by the process according to any one of [1] to [9] above as an inner liner.

Advantageous Effects of Invention

According to the present invention in producing a thermoplastic elastomer composition having a matrix phase comprising a polyamide resin and an ethylene/vinyl alcohol copolymer and a disperse phase comprising a rubber composition, gelation by a reaction between a polyamide and an ethylene/vinyl alcohol copolymer can be prohibited, and a thermoplastic elastomer composition with good dispersion of the rubber composition can be produced.

DESCRIPTION OF EMBODIMENTS

The present invention is a process for producing a thermoplastic elastomer composition having a matrix phase comprising a polyamide resin and an ethylene/vinyl alcohol copolymer and a disperse phase comprising a rubber composition, wherein the polyamide resin and the rubber composition are melt-blended to the extent necessary for the rubber composition to form a disperse phase, and then the ethylene/vinyl alcohol copolymer is added and further melt-blended together. In other words, according to the present invention three of a polyamide resin, an ethylene/vinyl alcohol copolymer, and a rubber composition are not melt-blended together at first, but first a polyamide resin and a rubber composition are melt-blended to prepare a blend of the polyamide resin and the rubber composition having a sea-island structure, in which the polyamide resin constitutes a matrix phase and the rubber composition constitutes a disperse phase; and then the ethylene/vinyl alcohol copolymer is added to the blend and melt-blended to prepare a thermoplastic elastomer composition having a sea-island structure, in which the polyamide resin and the ethylene/vinyl alcohol copolymer constitute a matrix phase, and the rubber composition constitutes a disperse phase. By delaying the addition of an ethylene/vinyl alcohol copolymer, the contact time of a polyamide resin and an ethylene/vinyl alcohol copolymer at an elevated temperature can be shortened, so that generation of particulate gels by gelation, of the polyamide resin and the ethylene/vinyl alcohol copolymer can be inhibited. Further, if a halogenated isoolefin/p-alkylstyrene copolymer is used as a rubber composition, the halogenated isoolefin/p-alkylstyrene copolymer has poor compatibility with an ethylene/vinyl alcohol copolymer, and when they are melt-blended, the halogenated isoolefin/p-alkylstyrene copolymer disperses poorly, but if a polyamide resin and the halogenated isoolefin/p-alkylstyrene copolymer are melt-blend previously for preparing a blend with a sea-island structure of a matrix phase comprising the polyamide resin and a disperse phase comprising the halogenated isoolefin/p-alkylstyrene copolymer, and then the ethylene/vinyl alcohol copolymer is added to the blend and melt-blended, the poor dispersion of the halogenated isoolefin/p-alkylstyrene copolymer can be avoided.

More specifically, but without being limited thereto, a polyamide resin and a rubber composition are melt-blended for preparing a blend composed of a polyamide resin matrix phase and a rubber composition disperse phase; the blend and an ethylene/vinyl alcohol copolymer are dry-blended; and the dry-blend is supplied to a forming extruder for melt-blending and forming, so as to produce a formed thermoplastic elastomer composition.

Further, a thermoplastic elastomer composition may be produced by using a twin screw kneader with at least two supply ports; and supplying a polyamide resin and a rubber composition to an upstream supply port of the twin screw kneader, and supplying an ethylene/vinyl alcohol copolymer to a downstream supply port of the twin screw kneader.

Preferably the melt viscosity $\eta_d$ is at 250° C. and 243 s$^{-1}$ of the blend prepared by melt-blending a polyamide resin and a rubber composition is higher than the melt viscosity $\eta_c$ at 250° C. and 243 s$^{-1}$ of an ethylene/vinyl alcohol copolymer to be added. By selecting the $\eta_d$ higher than the $\eta_c$, the ethylene/vinyl alcohol copolymer becomes advantageously more compatible with the matrix phase. In this connection, in order to adjust the $\eta_d$ higher than the $\eta_c$, the type of the polyamide resin and the ethylene content of the ethylene/vinyl alcohol copolymer should be changed appropriately.

Further, the melt-blending can be carried out continuously using a twin screw kneader, and by the melt-blending the rubber composition can be dispersed as well as dynamically cross-linked. In this regard, dynamical cross-linking means in general occurrence of cross-linking simultaneously with agitation, and means hereunder occurrence of cross-linking simultaneously with melt-blending. If dynamically cross-linked, the matrix phase and the disperse phase of a thermoplastic elastomer composition can be immobilized.

The temperature of melt-blending is a temperature not lower than the melting point of a polyamide resin, and preferably a temperature 20° C. higher than the melting point of a polyamide resin, for example, from 180 to 300° C.

Although there is no particular restriction on the melt-blending time duration of a polyamide resin and a rubber composition, insofar as it is sufficient for the rubber composition to form a disperse phase, it is usually 0.5 to 10 minutes, preferably 1 to 5 minutes. The melt-blending time duration of a polyamide resin/rubber composition blend and an ethylene/vinyl alcohol copolymer is usually 0.5 to 10 minutes, preferably 1 to 5 minutes. If the melt-blending time duration of a polyamide resin/rubber composition blend and an ethylene/vinyl alcohol copolymer is too short, the durability decreases due to poor dispersion, and if it is reversely too long, the durability decreases due to resin deterioration. If the melt-blending is carried out using a twin screw kneader with at least two supply ports; and the polyamide resin and the rubber composition are supplied to an upstream supply port of the twin screw kneader, and the ethylene/vinyl alcohol copolymer is supplied to a downstream supply port of the twin screw kneader; the retention time of the polyamide resin composition and the rubber composition from the supply to the twin screw kneader to the discharge therefrom corresponds to the melt-blending time duration of the polyamide resin and the rubber composition, and the retention time of the ethylene/vinyl alcohol copolymer from the supply to the discharge therefrom corresponds to the melt-blending time duration of the polyamide resin/rubber composition blend and the ethylene/vinyl alcohol copolymer.

The present invention relates to a process for producing a film of a thermoplastic elastomer composition having a matrix phase comprising a polyamide resin and an ethylene/vinyl alcohol copolymer and a disperse phase comprising a rubber composition, wherein a blend prepared by melt-blending the polyamide resin and the rubber composition and the ethylene/vinyl alcohol copolymer are dry-blended and fed to a forming extruder for carrying out melt-blending and forming a film simultaneously.

The thermoplastic elastomer composition of the present invention has a matrix phase and a disperse phase. The matrix phase comprises a polyamide resin and an ethylene/vinyl alcohol copolymer. The disperse phase comprises a rubber composition.

The ratio of the disperse phase to the matrix phase is preferably 70 to 280 parts by weight of the disperse phase to 100 parts by weight of the matrix phase, and more preferably 80 to 180 parts by weight of the disperse phase to 100 parts by weight of the matrix phase. If the disperse phase content is too small, durability at a low temperature is inferior; and if it is too large, the fluidity in a melt state decreases and film-formability becomes poor.

The content of an ethylene/vinyl alcohol copolymer is preferably 0.1 to 7.3% by weight based on the total weight of a thermoplastic elastomer composition, and more preferably 0.5 to 5.0% by weight. If the content of an ethylene/vinyl alcohol copolymer is too low, the gas barrier property becomes inferior, and reversely if it is too high the durability decreases.

The content of a polyamide resin is preferably 20 to 65% by weight based on the total weight of a thermoplastic elastomer composition, and more preferably 25 to 50% by weight. If the content of a polyamide resin is too low, the durability is inferior, and reversely if it is too high, the gas barrier property decreases.

Although there is no particular restriction on a polyamide resin to be used according to the present invention, it is preferably at least one selected from the group consisting of nylon 11, nylon 12, nylon 6, nylon 66, a nylon 6/66 copolymer, nylon 612, nylon MXD6, a nylon 6/66/12 copolymer, nylon 46, nylon 9T, nylon 6T, and nylon 610. Among them, nylon 6 and a nylon 6/66 copolymer are preferable from a viewpoint of the balance of the durability and the gas barrier property.

An ethylene/vinyl alcohol copolymer to be used according to the present invention (hereinafter occasionally referred to as "EVOH") is a copolymer composed of an ethylene unit ($-CH_2CH_2-$) and a vinyl alcohol unit ($-CH_2-CH(OH)-$), provided it may contain another constitutional unit in addition to an ethylene unit and a vinyl alcohol unit to the extent the advantageous effects of the present invention should not be impaired. The content of an ethylene unit, namely an ethylene compositional ratio of an ethylene/vinyl alcohol copolymer used, according to the present invention is preferably 32 to 48% by mol, and more preferably 38 to 48% by mol. If the ethylene content of an ethylene/vinyl alcohol copolymer is too low, the flexibility of the ethylene/vinyl alcohol copolymer decreases and the durability becomes poorer. Reversely, if the ethylene content is too high, the gas barrier property deteriorates. An ethylene/vinyl alcohol copolymer is a saponified ethylene-vinyl acetate copolymer, and the degree of saponification thereof is preferably 90% or higher, and more preferably 98% or higher. If the degree of saponification of an ethylene/vinyl alcohol copolymer is too low, the gas barrier property degrades, and the thermal stability also degrades. An ethylene/vinyl alcohol copolymer is available in the market, and available, for example, from Kuraray Co., Ltd. under the trade name of Eval®, and from The Nippon Synthetic Chemical Industry Co., Ltd. under the trade name of Soarnol®. Examples of an ethylene/vinyl alcohol copolymer with the ethylene content rate of 32 to 48% by mol and the degree of saponification of 90% or higher include Eval® H171B (having an ethylene content of 38% by mol and a degree of saponification of not less than 99%), and E171B (having an ethylene content of 44% by mol and a degree of saponification of not less than 99%) produced by Kuraray Co., Ltd.; and Soarnol® H4815B (having an ethylene content of 48% by mol and a degree of saponification of not less than 99%), A4412B (having an ethylene content of 42% by mol and a degree of saponification of not less than 99%), and DC3212B (having an ethylene content of 32% by mol and a degree of saponification of not less than 99%) produced by The Nippon Synthetic Chemical Industry Co., Ltd.

The matrix phase comprising a polyamide resin and an ethylene/vinyl alcohol copolymer may contain another substance, such as a resin or an additive (e.g. a plasticizer), other than a polyamide resin and an ethylene/vinyl alcohol copolymer to the extent the advantageous effects of the present invention should not be impaired.

A rubber composition constituting the disperse phase comprises at least a rubber and may comprise various additives according to need. Examples of an additive include a cross-linking agent, a cross-linking aid, a cross-linking accelerator, a reinforcing agent (filler), an antiscorching agent, an age resister, a peptizing agent, an organic modifying agent, a softening agent, a plasticizer, and a tackifying agent. The contents of such additives may adopt the contents generally applied to a conventional rubber composition, insofar as the object of the present invention is not jeopardized.

Examples of rubber constituting a rubber composition include a diene rubber and a hydrogenated derivative thereof, such as a natural rubber (NR), an isoprene rubber (IR), a styrene butadiene rubber (SBR), a butadiene rubber (BR), and an acrylonitrile butadiene rubber (NBR); an olefinic rubber, such as an ethylene propylene rubber (EPDM, EPM), and a butyl rubber (IIR); an acrylic rubber (ACM); a halogen-containing rubber, such as Br-IIR, Cl-IIR, and a halogenated isoolefin/p-alkylstyrene copolymer; a silicone rubber, such as a methyl vinyl silicone rubber, and a dimethyl silicone rubber; a sulfur-containing rubber, such as a polysulfide rubber; a fluorocarbon rubber, such as a vinylidene fluoride rubber, and a fluorine-containing vinyl ether rubber; and a thermoplastic elastomer, such as a styrenic elastomer, an olefinic elastomer, an acid-modified olefinic elastomer, an ester elastomer, a urethane elastomer, and a polyamide elastomer.

Among others, as a rubber preferable are a halogenated isoolefin/p-alkylstyrene copolymer, a maleic anhydride-modified ethylene/α-olefin copolymer, a maleic anhydride-modified ethylene/ethyl acrylate copolymer, and an ethylene/glycidyl methacrylate copolymer.

A halogenated isoolefin/p-alkylstyrene copolymer can be produced by halogenating a copolymer of an isoolefin and a p-alkylstyrene, wherein the content ratio of the halogenated isoolefin and p-alkylstyrene, the rate of polymerization, the average molecular weight, the polymerization mode (block copolymer, random copolymer, etc.), the viscosity, the type Of a halogen atom, etc., may be selected arbitrarily without particular restriction according to the required properties of a thermoplastic elastomer composition. Examples of an isoolefin constituting a halogenated isoolefin/p-alkyistyrene copolymer include isobutylene, isopentene, and isohexene, and isobutylene is preferable. Examples of a p-alkylstyrene constituting a halogenated isoolefin/p-alkylstyrene copolymer include p-methylstyrene, p-ethylstyrene, p-propylstyrene, and butylstyrene, and p-methylstyrene is preferable. Examples of a halogen constituting a halogenated isoolefin/p-alkylstyrene copolymer include fluorine, chlorine, bromine, and iodine, and bromine is preferable. An especially preferable halogenated isoolefin/p-alkylstyrene copolymer is a brominated isobutylene/p-methylstyrene copolymer (Br-IPMS).

A brominated isobutylene/p-methylstyrene copolymer is a brominated derivative of an isobutylene/p-methyl styrene copolymer having the recurring unit represented by the formula (1):

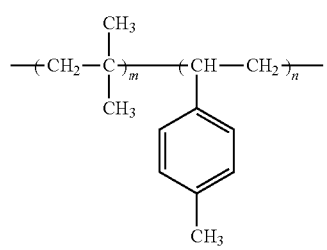

(1)

and typically is the one having the recurring unit represented by the formula (2):

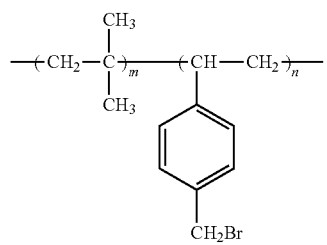

(2)

A brominated isobutylene/p-methyl styrene copolymer is available from ExxonMobil Chemical Company under the trade name of Exxpro®.

A rubber composition constituting the disperse phase of a thermoplastic elastomer composition is preferably cross-linked by dynamical cross-linking. By dynamical cross-linking, the matrix phase and the disperse phase of a thermoplastic elastomer composition can be immobilized. Dynamical cross-linking can be carried out by melt-blending an uncross-linked rubber composition together with a cross-linking agent.

Examples of a cross-linking agent to be used for dynamical cross-linking include zinc white, stearic acid, zinc stearate, magnesium oxide, m-phenylenebismaleimide, an alkylphenol resin and a halogenated derivative thereof, and a secondary amine (such as N-(1,3-dimethylbutyl)-N'-phenyl-p-phenylenediamine, and a polymerized 2,2,4-trimethyl-1,2-dihydroquinoline). Among other's, zinc white, stearic acid, zinc stearate, and N-(1,3-dimethylbutyl)-N'-phenyl-p-phenylenediamine can be preferably used as a cross-linking agent.

The amount of a cross-linking agent is preferably 0.1 to 12 parts by weight, and more preferably 1 to 9 parts by weight based on 100 parts by weight of the rubber. If the amount of a cross-linking agent is too little, cross-linking becomes insufficient and fine dispersion of a rubber composition cannot be maintained and the durability decreases. However, if the amount of a cross-linking agent is too high, scorching may occur during kneading or processing, or an object may be generated in a film.

In a thermoplastic elastomer composition according to the present invention, a polyamide resin and an ethylene/vinyl alcohol copolymer constitute the matrix phase, and a rubber composition constitutes the disperse phase. Such a phase structure can be formed by selecting appropriately the content ratio of a polyamide resin and an ethylene/vinyl alcohol copolymer to a rubber composition, and the viscosity. In theory, the higher the content rate of a polyamide resin and an ethylene/vinyl alcohol copolymer is, and the smaller the viscosity of a polyamide resin and an ethylene/vinyl alcohol copolymer is, the easier the polyamide resin and the ethylene/vinyl alcohol copolymer can form the matrix phase.

A thermoplastic elastomer composition according to the present invention may contain components other than those described above to the extent the advantageous effects of the present invention should not be impaired.

Since a thermoplastic elastomer composition produced by a process according to the present invention is superior in the gas barrier property and the durability, it can be utilized favorably as an inner liner of a pneumatic tire.

A thermoplastic elastomer composition according to the present invention can be formed into a film, etc. by an extruder with a T-die or a blown film extruding device. By a process according to the present invention, even if the forming is carried out continuously for a long time period, generation of particulate gels is limited.

A film of a thermoplastic elastomer composition produced according to a process of the present invention is superior in the gas barrier property and the durability, it can be utilized favorably as an inner liner of a pneumatic tire.

A thermoplastic elastomer composition can be also laminated with an adhesive composition to yield a laminate. As an adhesive composition, that having good adhesiveness with a rubber constituting a pneumatic tire is preferable, and examples thereof include but not being limited to a composition containing an epoxidized styrene/butadiene/styrene block copolymer, zinc oxide, stearic acid, a vulcanization accelerator, and a tackifying agent. The laminate of a thermoplastic elastomer composition and an adhesive composition can be produced, for example, by co-extruding a thermoplastic elastomer composition and an adhesive composition. Since the laminate of a thermoplastic elastomer composition and an adhesive composition is superior in adhesiveness with a rubber constituting a pneumatic tire, it can be utilized favorably as an inner liner of a pneumatic tire.

A pneumatic tire according to the present invention is a pneumatic tire comprising the thermoplastic elastomer composition as an inner liner. More specifically, it is a pneumatic tire comprising the thermoplastic elastomer composition film or the laminate as an inner liner. As a process for producing a tire, a conventional process is applicable. For example, a thermoplastic elastomer composition according to the present invention is extruded to a film with the predetermined width and thickness as an inner liner, which is then overlaid on a tire building drum in a cylindrical form. On top of it, components made of an unvulcanized rubber and used usually for producing a tire, such as a carcass ply, a belt ply, and a tread ply, are overlaid successively, which are then removed from the drum as a green tire. Next the green tire is vulcanized by heating according to a conventional process to complete a desired pneumatic tire.

EXAMPLES

Raw materials used in the following Examples and Comparative Examples are as follows.

As a polyamide, the following two kinds were used:
Nylon 6/66: "UBE Nylon" 5033B, by Ube Industries, Ltd., and
Nylon 6: "UBE Nylon" 1030B, by Ube Industries, Ltd.

As an ethylene/vinyl alcohol copolymer (hereinafter abbreviated as "EVOH") Eval® H171B by Kuraray Co., Ltd. was used.

As the rubber, a brominated isobutylene/p-methylstyrene copolymer: Exxpro® MDX89-4 (abbreviated as "Br-IPMS") by ExxonMobil Chemical Company was used.

As a cross-linking agent the following three types were used:
Zinc white: Zinc white No. 3 by Seido Chemical Industry Co., Ltd.,
Stearic acid: Stearic Acid Bead by NOF Corporation, and
Zinc stearate: Zinc stearate by Sakai Chemical Industry Co., Ltd.

As a plasticizer, N-butylbenzenesulfonamide (abbreviated as "BBSA"): BM-4 by Daihachi Chemical Industry Co., Ltd. was used.

As an acid-modified polyolefin, a maleic anhydride-modified ethylene/ethyl acrylate copolymer (abbreviated as "Mah-EEM"): HPR AR201 by DuPont-Mitsui Polychemicals Co., Ltd. was used.

Example 1

One hundred (100) parts by weight of the rubber (Br-IPMS) and the cross-linking agents (0.15 part by weight of zinc white, 0.60 part by weight of stearic acid, and 0.30 part by weight of zinc stearate) were charged into a hermetic Banbury mixer (by Kobe Steel, Ltd.) and mixed at 100° C. for 2 minutes to-prepare a rubber compound, which was then pelletized by a rubber pelletizer (by Moriyama Company Limited).

Meanwhile, 63 parts by weight of the nylon 6/66 copolymer and 27 parts by weight of the plasticizer (BBSA) were kneaded in a twin screw kneader (by Japan Steel Works, Ltd.) at 250° C. for 3 minutes and pelletized to prepare polyamide resin composition pellets. Ninety (90) parts by weight of the prepared polyamide resin composition pellets, 101.05 parts by weight of the rubber compound pellets, and 10 parts by weight of the modified polyolefin (Mah-EEA) were kneaded by a twin screw kneader (by Japan Steel Works, Ltd.) at 250° C., for 3 minutes. The kneaded material was discharged continuously in a strand form, and cut by an under-water cutter to yield pellets of a blend of the polyamide resin and the rubber composition.

Two hundred and one point zero five (201.05) parts by weight of the pellets of the blend of the polyamide resin and the rubber composition and 7.3 parts by weight of pellets of the ethylene/vinyl alcohol copolymer were dry-blended to yield a pellet blend.

Further, all of the raw materials shown in Table 2 were fed in a twin screw extruder (TEX44, by Japan Steel Works, Ltd.) and kneaded at 120° C. for 3 minutes. By extruding the kneaded blend in a strand form, and cutting the extruded strand by an under-water cutter to yield pellets of an adhesive composition.

The pellet blend prepared by dry-blending the pellets of the blend of the polyamide resin and the rubber composition and the pellets of the ethylene/vinyl alcohol copolymer, and the pellets of the adhesive composition, prepared respectively as above, were supplied to a blown film extruding device (by Placo Co., Ltd.), extruded at 230° C. in a form of a 2-layer tube with the inner layer of the thermoplastic: elastomer composition and the outer layer of the adhesive composition, inflated by blowing air, folded by pinch rolls and reeled up to yield a tubular laminated film. The thickness of a thermoplastic elastomer composition layer in the obtained laminate was 80 μm, and the thickness of an adhesive composition layer was 20 μm.

With respect to the prepared thermoplastic elastomer composition, the continuous forming property, the film appearance, the tire durability and the air permeability were evaluated. The evaluation methods of the respective evaluation items are described below.

The evaluation results are shown in Table 1.

Example 2

A thermoplastic elastomer composition was prepared identically with Example 1, except that nylon 6 was used instead of the nylon 6/66 copolymer, BBSA was not used, and the content of the ethylene/vinyl alcohol copolymer was changed to 6.3 parts by weight, and the continuous forming property, the film appearance, the tire durability and the air permeability were evaluated. The evaluation results are shown in Table 1.

Example 3

A thermoplastic elastomer composition was prepared identically with Example 1, except that the content of the ethylene/vinyl alcohol copolymer was changed to 15.1 parts by weight, and the continuous forming property, the film appearance, the tire durability and the air permeability were evaluated. The evaluation results are shown in Table 1.

Example 4

A thermoplastic elastomer composition was prepared identically with Example 1, except that the content of the ethylene/vinyl alcohol copolymer was changed to 4.0 parts by weight, and the continuous forming property, the film appearance, the tire durability and the air permeability were evaluated. The evaluation results are shown in Table 1.

Example 5

One hundred (100) parts by weight of the rubber (Br-IPMS) and the cross-linking agents (0.15 part by weight of zinc white, 0.60 part by weight of stearic acid, and 0.30 part by weight of zinc stearate) were charged into a hermetic Banbury mixer (by Kobe Steel, Ltd.) and mixed at 100° C. for 2 minutes to prepare a rubber compound, which was then pelletized by a rubber pelletizer (by Moriyama Company limited). Meanwhile, 63 parts by weight of the nylon 6/66 copolymer, and 27 parts by weight of the plasticizer (BBSA) were kneaded in a twin screw kneader (by Japan Steel Works, Ltd.) at 250° C. for 3 minutes and pelletized to prepare polyamide resin composition pellets. Then using a twin screw kneader (by Japan Steel Works, Ltd.) having two supply ports, 90 parts by weight of the polyamide resin composition pellets, 101.05 parts by weight of the rubber compound pellets, and 10 parts by weight of the modified polyolefin (Mah- EEA) were supplied to an upstream supply port of the twin screw kneader, and 10.6 parts by weight of the ethylene/vinyl alcohol copolymer pellets were supplied to a downstream supply port of the twin screw kneader, followed by kneading at 250° C. The retention time of the polyamide resin composition and the rubber composition from the supply to the twin screw kneader to the discharge therefrom was 3 minutes, and the retention time of the ethylene/vinyl alcohol copolymer from the supply to the twin screw kneader to the discharge therefrom was 1.5 minutes. The kneaded material was discharged continuously in a strand form, and cut by an under-water cutter to yield pellets of the thermoplastic elastomer composition.

The pellets of the thermoplastic elastomer composition and the adhesive composition pellets prepared in Example 1 were supplied to a blown film extruding device (by Placo Co., Ltd.) as in Example 1 to yield a tubular laminated film.

As in Example 1, the continuous forming property, the film appearance, the tire durability and the air permeability were evaluated. The evaluation results are shown in Table 1.

Comparative Example 1

Identically as in Example 1 pellets of a blend of the polyamide resin and the rubber composition were prepared. The pellets of a blend of the polyamide resin and the rubber composition and the adhesive composition pellets prepared in Example 1 were supplied to a blown film extruding device (by Placo Co., Ltd.) as in Example 1 to yield a tubular laminated film.

As in Example 1, the continuous forming property, the film appearance, the tire durability and the air permeability were evaluated. The evaluation results are shown in Table 1.

In Comparative Example 1 an ethylene/vinyl alcohol copolymer was not added, and the air permeability is large (inferior in the gas barrier property) compared to Examples.

Comparative Example 2

As in Example 1, rubber compound pellets and polyamide resin composition pellets were prepared. ninety (90) parts by weight of the prepared polyamide resin composition pellets, 101.05 parts by weight of the rubber compound pellets, 10 parts by weight of the modified polyolefin (Mah-EEA), and 7.3 parts by weight of the pellets of the ethylene/vinyl alcohol copolymer were fed simultaneously into a twin screw kneader (by Japan Steel Works, Ltd.) and kneaded at 250° C. for 3 minutes. The kneaded material was discharged continuously in a strand form, and cut by an under-water cutter to yield pellets of a thermoplastic elastomer composition.

The pellets of a thermoplastic elastomer composition and the adhesive composition pellets prepared in Example 1 were supplied to a blown film extruding device (by Placo Co., Ltd.) as in Example 1 to yield a tubular laminated film.

As in Example 1, the continuous forming property, the film appearance, the tire durability and the air permeability were evaluated. The evaluation results are shown in Table 1.

In Comparative Example 2, the ethylene/vinyl alcohol copolymer was fed to a twin screw kneader simultaneously with the polyamide resin and the rubber composition, and the film appearance was inferior by reason of slight generation of particulate gels and pinholes, the tire durability was also inferior to the Examples, and, in the case of long-lasting forming, particulate gels were apt to appear.

Comparative Example 3

Pellets of a thermoplastic elastomer composition were prepared and the laminated film was produced identically with Comparative Example 2, except that the content of the ethylene/vinyl alcohol copolymer pellets was changed to 15.1 parts by weight.

As in Example 1, the continuous forming property, the film appearance, the tire durability and the air permeability were evaluated. The evaluation results are shown in Table 1.

In Comparative Example 3 as in Comparative Example 2, the ethylene/vinyl alcohol copolymer was fed to a twin screw kneader simultaneously with the polyamide resin and the rubber composition, and the film appearance was inferior by reason of slight generation of particulate gels and pinholes, the tire durability was also inferior to Examples, and, in the case of long-lasting forming, particulate gels were apt to appear.

[Evaluation of Continuous Formability]

The forming of a tubular laminated film using a blown film extruding device (by Placo Co., Ltd.) was continued for a long time period, and rating was conducted as per the following criteria.

Excellent: After a continuous forming operation of 5 hours or longer, there is no particulate gel.

Good: After a continuous forming operation of 5 hours or longer, there is some particulate gels, but forming is still possible.

Fair: After a continuous forming operation of 3 hours or longer, there is some particulate gels, but forming is still possible.

[Evaluation of Film Appearance]

The appearance of a tubular film produced by a blown film extruding device (by Placo Co., Ltd.) was observed and rated based on the following criteria.

Excellent: There is zero particulate gel or pinholes per 1 m$^2$ of the film area.

Good: There are less than 5 particulate gels or pinholes per 1 m$^2$ of the film area.

Fair: There are 5 or more particulate gels or pinholes per 1 m$^2$ of the film area.

[Evaluation of Air Permeability (Gas Barrier Property)]

From a laminated film produced by a blown film extruding device (by Placo Co., Ltd.), an adhesive composition layer was dissolved with methyl ethyl ketone (MEK) and wiped off leaving a thermoplastic elastomer composition film, and the air permeability coefficient (cc·cm/cm$^2$·sec·cmHg) at a temperature of 30° C. was determined according to JIS K7126-1 (Differential-pressure method) and expressed in an exponential representation based on the air permeability of Comparative Example 1 as 300. The smaller value means the lower air permeability, and therefore the better gas barrier property.

[Evaluation of Tire Durability]

A laminated film produced as an inner liner by a blown film extruding device (by Placo Co., Ltd.) was placed on a tire building drum directing the adhesive composition layer outward (opposite to the drum), and on top of it components made of an unvulcanized rubber and used usually for producing a tire, such as a carcass ply, a belt ply, and a tread ply, were overlaid successively, to provide a green tire by removing the drum; and then the green tire was vulcanized by heating according to a conventional process to complete a tire with the size of 195/65R15. The completed tire with a 15×6JJ rim at an inner pressure of 200 kPa was mounted on an FF passenger car of 18.00 cc displacement and logged 30,000 km on a real road. Thereafter the tire was removed from the rim and the laminated film located at the inner surface of the tire was observed for examining the presence of cracks, and rated as per the following criteria.

Excellent: There are no cracks.
Good: There are less than 10 cracks.
Fair: There are 10 or more cracks.

TABLE 1

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Rubber | Br-IPMS | 100 | 100 | 100 | 100 | 100 | 100 | 100 | 100 |
| Cross-linking agent | Zinc white | 0.15 | 0.15 | 0.15 | 0.15 | 0.15 | 0.15 | 0.15 | 0.15 |
|  | Stearic acid | 0.60 | 0.60 | 0.60 | 0.60 | 0.60 | 0.60 | 0.60 | 0.60 |
|  | Zinc stearate | 0.30 | 0.30 | 0.30 | 0.30 | 0.30 | 0.30 | 0.30 | 0.30 |
| Resin | Nylon 6/66 copolymer | 63 |  | 63 | 63 | 63 | 63 | 63 | 63 |
|  | Nylon 6 |  | 63 |  |  |  |  |  |  |
| Plasticizer | BBSA | 27 |  | 27 | 27 | 27 | 27 | 27 | 27 |
| Modified polyolefin | Mah-EEA | 10 | 10 | 10 | 10 | 10 | 10 | 10 | 10 |
|  | EVOH | 7.3 | 6.3 | 15.1 | 4.0 | 7.3 |  | 7.3 | 15.1 |
| Total |  | 208.35 | 180.35 | 216.15 | 205.05 | 208.35 | 201.05 | 208.35 | 216.15 |
| Continuous forming property |  | Excellent | Excellent | Good | Excellent | Good | Excellent | Fair | Fair |
| Film appearance |  | Excellent | Excellent | Good | Excellent | Good | Excellent | Fair | Fair |
| Air permeability |  | 130 | 15 | 85 | 220 | 135 | 300 | 140 | 90 |
| Tire durability |  | Excellent | Excellent | Good | Excellent | Good | Excellent | Fair | Fair |

TABLE 2

Recipe of adhesive composition

|  | parts by weight |
|---|---|
| Epoxidized styrene butadiene styrene block copolymer *1 | 100 |
| Zinc oxide *2 | 5 |
| Stearic acid *3 | 1 |
| Vulcanization accelerator *4 | 3 |
| Tackifying agent *5 | 30 |
| Total | 139 |

Foot note:
*1 Epofriend AT501, by Daicel Corporation
*2 Zinc white No. 3, by Seido Chemical Industry Co., Ltd.
*3 Stearic Acid Bead YR, by NOF Corporation
*4 Nocceler TOT-N, by Ouchi-Shinko Chemical Industrial Co., Ltd.
*5 YS Resin D105, by Yasuhara Chemical Co., Ltd.

INDUSTRIAL APPLICABILITY

A thermoplastic elastomer composition to be produced by a process according to the present invention can be used favorably as an inner liner for a pneumatic tire.

The invention claimed is:

1. A process for producing a thermoplastic elastomer composition having a matrix phase comprising a polyamide resin and an ethylene/vinyl alcohol copolymer and a disperse phase comprising a rubber composition, wherein, using a twin screw kneader having at least two supply ports, the polyamide resin and the rubber composition are supplied to an upstream supply port of the twin screw kneader, and the polyamide resin and the rubber composition are melt-blended to prepare a blend of the polyamide resin and the rubber composition having a sea-island structure, in which the polyamide resin constitutes a matrix phase and the rubber composition constitutes disperse phases, and, by supplying the ethylene/vinyl alcohol copolymer to a downstream supply port of the twin kneader, the ethylene/vinyl alcohol copolymer is added to the blend and melt-blended to prepare a thermoplastic elastomer composition having sea-island structure, in which the polyamide resin and the ethylene/vinyl alcohol copolymer constitute a matrix phase, and the rubber composition constitutes a disperse phase.

2. The process according to claim 1, wherein the melt viscosity $\eta_d$ at 250° C. and 243 s$^{-1}$ of the blend prepared by melt-blending the polyamide resin and the rubber composition is higher than a melt viscosity $\eta_c$ at 250° C. and 243 s$^{-1}$ of the ethylene/vinyl alcohol copolymer to be added.

3. The process according to claim 2, wherein the thermoplastic elastomer composition comprises 0.1 to 7.3% by weight of the ethylene/vinyl alcohol copolymer based on the total weight of the thermoplastic elastomer composition.

4. The process according to claim 2, wherein the thermoplastic elastomer composition comprises 0.1 to 7.3% by weight of the ethylene/vinyl alcohol copolymer based on the total weight of the thermoplastic elastomer composition.

5. The process according to claim 1, wherein the thermoplastic elastomer composition comprises 0.1 to 7.3% by weight of the ethylene/vinyl alcohol copolymer based on the total weight of the thermoplastic elastomer composition.

6. The process according to claim 1, wherein the polyamide resin is at least one selected from the group consisting of nylon 11, nylon 12, nylon 6, nylon 66, a nylon 6/66 copolymer, nylon 612, nylon MXD6, a nylon 6/66/12 copolymer, nylon 46, nylon 9T, nylon 6T, and nylon 610.

7. The process according to claim 1, wherein the ethylene/vinyl alcohol copolymer has an ethylene content of 32 to 48% by mol and a degree of saponification of not less than 90%.

8. The process according to claim 1, wherein the rubber composition comprises at least one selected from the group consisting of a halogenated isoolefin/p-alkylstyrene copolymer, a maleic anhydride-modified ethylene/α-olefin copolymer, and a maleic anhydride-modified ethylene/ethyl acrylate copolymer.

* * * * *